(12) United States Patent
Nanda et al.

(10) Patent No.: US 10,887,351 B2
(45) Date of Patent: Jan. 5, 2021

(54) SECURITY FOR IOT HOME VOICE ASSISTANTS

(71) Applicant: NortonLifeLock Inc., Tempe, AZ (US)

(72) Inventors: Susanta K. Nanda, San Jose, CA (US); Yuqiong Sun, Mountain View, CA (US); Saurabh Shintre, Sunnyvale, CA (US)

(73) Assignee: NortonLifeLock Inc., Tempe, AZ (US)

( * ) Notice: Subject to any disclaimer, the term of this patent is extended or adjusted under 35 U.S.C. 154(b) by 248 days.

(21) Appl. No.: 15/969,193

(22) Filed: May 2, 2018

(65) Prior Publication Data
US 2019/0342339 A1    Nov. 7, 2019

(51) Int. Cl.
*H04L 29/06* (2006.01)

(52) U.S. Cl.
CPC .............. *H04L 63/20* (2013.01); *H04L 63/02* (2013.01); *H04L 63/102* (2013.01); *H04L 63/0428* (2013.01); *H04L 63/101* (2013.01); *H04L 63/107* (2013.01)

(58) Field of Classification Search
CPC ....... H04L 63/20; H04L 63/02; H04L 63/102; H04L 63/0428; H04L 63/101; H04L 63/107
See application file for complete search history.

(56) References Cited

U.S. PATENT DOCUMENTS

| | | | |
|---|---|---|---|
| 6,545,669 B1 * | 4/2003 | Kinawi | G06F 3/0486 345/1.1 |
| 8,625,796 B1 * | 1/2014 | Ben Ayed | H04L 63/0853 380/258 |
| 9,940,930 B1 * | 4/2018 | Campbell | G06F 3/167 |
| 10,319,371 B2 * | 6/2019 | Zhao | G10L 15/22 |

(Continued)

FOREIGN PATENT DOCUMENTS

WO    2018067260 A1    4/2018

OTHER PUBLICATIONS

Hyunji Chung, Michaela Iorga and Jeffrey Voas. "Alexa, Can I Trust You?" IEEE Computer Society, vol. 50, No. 9 (2017), pp. 100-104.

(Continued)

*Primary Examiner* — Ghodrat Jamshidi
(74) *Attorney, Agent, or Firm* — Holland & Hart LLP

(57) ABSTRACT

A method for implementing security of Internet of Things (IoT) home voice assistants is described. In one embodiment, a computer-implemented method for implementing a security policy with a voice assistant includes obtaining, by one or more computing devices, encrypted traffic from a voice assistant; identifying, by the one or more computing devices, a user voice command in the encrypted traffic based at least in part on one or more identifiable attributes of the encrypted traffic; determining, by the one or more computing devices, the user voice command triggers at least one security policy; and upon determining the user voice command triggers the at least one security policy, performing, by (Continued)

the one or more computing devices, a security action that implements the at least one security policy. In some cases, the method may include obtaining an audio recording of the user voice command with a microphone built into the router.

18 Claims, 10 Drawing Sheets

(56) References Cited

U.S. PATENT DOCUMENTS

| | | | |
|---|---|---|---|
| 10,592,095 B2 * | 3/2020 | Kasemset | G10L 13/02 |
| 2003/0144845 A1 * | 7/2003 | Lee | G10L 15/22 |
| | | | 704/275 |
| 2005/0222933 A1 * | 10/2005 | Wesby | G06Q 40/00 |
| | | | 705/36 R |
| 2006/0092915 A1 * | 5/2006 | Moore | H04L 29/06027 |
| | | | 370/352 |
| 2015/0039319 A1 * | 2/2015 | Mei | G10L 15/1822 |
| | | | 704/275 |
| 2016/0226920 A1 * | 8/2016 | Ansari | H04L 63/10 |
| 2018/0007004 A1 * | 1/2018 | Basler | H04L 63/0236 |
| 2018/0024520 A1 * | 1/2018 | Sinha | G05B 13/0205 |
| | | | 700/275 |
| 2018/0033424 A1 * | 2/2018 | Pechanec | G10L 21/0364 |
| 2018/0124035 A1 * | 5/2018 | Price | H04L 63/0428 |
| 2018/0144590 A1 * | 5/2018 | Mixter | G10L 15/22 |
| 2018/0211656 A1 * | 7/2018 | Chong | G10L 17/00 |
| 2018/0262607 A1 * | 9/2018 | Chug | H04M 1/72519 |
| 2019/0171413 A1 * | 6/2019 | Beatty | G06F 3/167 |
| 2019/0192072 A1 * | 6/2019 | Bailey | A61F 2/40 |
| 2019/0216228 A1 * | 7/2019 | Bertinato | G10L 15/22 |
| 2019/0273733 A1 * | 9/2019 | Kawabata | H04L 63/0876 |
| 2019/0333523 A1 * | 10/2019 | Kim | G06F 21/6209 |

OTHER PUBLICATIONS

International Search Report and Written Opinion, PCT/US2019/024121, dated May 24, 2019.

* cited by examiner

SECURITY FOR IOT HOME VOICE ASSISTANTS

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Security policies may be configured detect security violations and prevent certain security violations before they may occur.

SUMMARY

According to at least one embodiment, a method for implementing security of Internet of Things (IoT) home voice assistants is described. In one embodiment, a computer-implemented method for implementing a security policy with a voice assistant may be performed by one or more computing devices, each comprising one or more processors. The method may include obtaining, by the one or more computing devices, encrypted traffic from a voice assistant; identifying, by the one or more computing devices, a user voice command in the encrypted traffic based at least in part on one or more identifiable attributes of the encrypted traffic; determining, by the one or more computing devices, the user voice command triggers at least one security policy; and upon determining the user voice command triggers the at least one security policy, performing, by the one or more computing devices, a security action that implements the at least one security policy. In some cases, obtaining the encrypted traffic is performed with a router in communication with a cloud service.

In some cases, the method may include obtaining an audio recording of the user command with a microphone built into the router. In some examples, the method may include generating, by the one or more computing devices, a library of the identifiable attributes of the user voice commands based at least in part on analysis of encrypted traffic generated by the voice assistant and at least in part on analysis of the audio recording over a period of time. The method may include identifying the user voice command includes matching at least one of the one or more identifiable attributes of the encrypted traffic with one or more attributes of an analyzed user voice command stored in the library.

In some examples, the one or more identifiable attributes of the encrypted traffic comprises at least an interactive data communication pattern between the voice assistant and a cloud service in communication with the voice assistant. In another example, the one or more identifiable attributes of the encrypted traffic comprises at least a user voice command history. In another embodiment, the one or more identifiable attributes of the encrypted traffic comprises at least a length of an audio recording associated with the encrypted traffic.

In some cases, the security policy includes blocking a user command from the voice assistant to a cloud service at a router in communication with the cloud service. In another example, the security policy includes generating an alert based in the user command and sending the alert to a user. In some cases, the security policy includes blocking the user command based on a response from the user receiving the alert. In another example, the security policy includes blocking the user command when the user command is given under a predefined context. In some cases, the predefined context is a time context, a user location context, a device location context, a user identity context, a device type context, a device identification context, or combinations thereof.

A computing device configured for implementing security of Internet of Things (IoT) home voice assistants is also described. The computing device may include a processor and memory in electronic communication with the processor. The memory may store computer executable instructions that when executed by the processor cause the processor to obtain encrypted traffic from a voice assistant, identify a user voice command in the encrypted traffic based at least in part on one or more identifiable attributes of the encrypted traffic, determine the user voice command triggers at least one security policy, and upon determining the user voice command triggers the at least one security policy, perform a security action that implements the at least one security policy.

In one embodiment, the computing device may be a router in communication with a cloud service. In some examples, the instructions executed by the processor cause the processor to perform the steps of obtaining an audio recording of the user command with a microphone built into the router and comparing the audio recording to the encrypted traffic. In some embodiments, the instructions executed by the processor cause the processor to perform the steps of generating a library of audio recordings of a user command associated with the encrypted traffic. In some cases, the instructions executed by the processor cause the processor to perform the steps of determining a subsequent user command by comparing at least one attribute stored in the library. In some examples, the at least one security policy comprises blocking the user command.

A non-transitory computer-readable storage medium storing computer executable instructions is also described. When the instructions are executed by a processor, the execution of the instructions may cause the processor to perform the steps of obtaining encrypted traffic from a voice assistant, identifying a user voice command in the encrypted traffic based at least in part on one or more identifiable attributes of the encrypted traffic, determining the user voice command triggers at least one security policy, and upon determining the user voice command triggers the at least one security policy, performing a security action that implements the at least one security policy.

In some examples, the instructions executed by the processor cause the processor to perform the steps of obtaining an audio recording of the user command with a microphone built into the router and comparing the audio recording to the encrypted traffic. In some embodiments, the instructions executed by the processor cause the processor to perform the steps of generating a library of audio recordings of a user command associated with the encrypted traffic. In some cases, the instructions executed by the processor cause the processor to perform the steps of determining a subsequent user command by comparing at least one attribute stored in the library. In some examples, the at least one security policy comprises blocking the user command.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
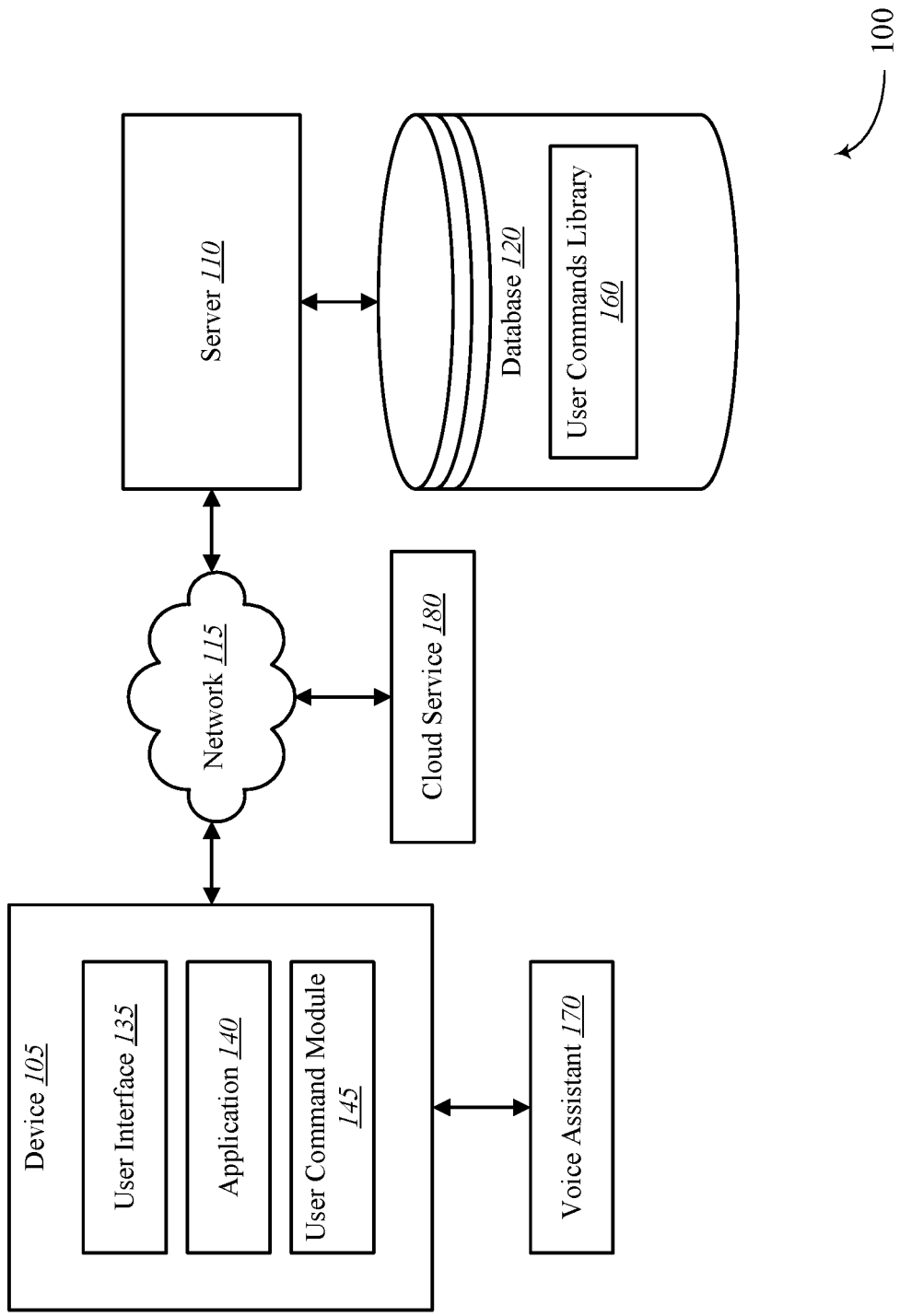
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to implementing security policies with voice assistants. More specifically, the systems and methods described herein relate to implementing security policies to block user commands obtained by a voice assistant from reaching a cloud service by blocking the user command at a router in communication with the voice assistant and the cloud service.

Home voice assistants are getting increasingly popular in today's world. They enable users to provide voice commands to carry out tasks by other IoT devices or by the assistant itself. As the tasks get more and more complex and sensitive—examples include opening door locks, managing thermostat temperature, running irrigation systems, shopping online, and so on—there is a need for better security and granular policy controls, which today's mostly all-or-none approach does not address.

Voice assistants may include computing devices configured to receive audio commands, interpret the audio commands, and perform one or more operations based at least in part on interpreting the audio commands. In some cases, voice assistants may be used to control other device in a premises such as a home or office, etc., when a user gives audible instructions to the voice assistant. For example, a user may speak to the voice assistant with instructions to adjust a temperature of a home thermostat. A microphone of the voice assistant may capture the audible message and send the user's message to a cloud service where speech recognition may be applied to the user's audible instructions. The cloud service may send the appropriate commands back to the voice assistant to forward to the appropriate device in the home to carry out the requested action by the user. In response to understanding the audible instructions, the voice assistant may send instructions to the home's climate control system to carry out the user's audible instructions. In other examples, the cloud service routes the commands directly to the device that is to carry out the user's instructions. In other examples, the user may give audible instructions to open a door, turn off a light, preheat an oven, answer a question, or perform another task. The voice assistant may send these instructions to the cloud service where the instructions are interpreted and routed to the appropriate device for carrying out the user's instructions.

A mechanism of correlating encrypted traffic patterns between voice assistant clients and the cloud voice service with the voice captured by microphone built into Wi-Fi internet routers may be used to identify user commands. In response to a user command being identified, appropriate controls may be enforced. In some cases, if a particular user command needs to be blocked, the packets may be dropped by the router and a voice notification may be played back to the user to convey the message.

The voice assistant may send the instructions to the cloud service via a router. In some cases, the router may interface between a home network and a network external to the home (e.g., the Internet). The router may include a microphone configured to record the same audible instructions that are received by the voice assistant. The router may generate a library of user commands that it records through its microphone. The router may also receive the traffic from the voice assistant. In some cases, the traffic from the voice assistant is encrypted. The router may also send the encrypted traffic or at least some of the attributes of the encrypted traffic to the library when the attributes of the encrypted traffic and the user commands are associated with each other. In some cases, the attributes of the encrypted traffic may include a length of the encrypted message, an interactive pattern between the voice assistant and the cloud service, a user command history, or other types of attributes. These attributes and others may be associated with the user commands that were recorded with the router's microphone.

In those situations where the user command is recorded by the microphone of the router, the router may understand the user command. In this situation, the router may understand where the user command is given by the user issues the command. In other situations where a security policy is triggered by the user command, the router may cause the security action to be performed. For example, the router may cause the user command to be blocked from reaching the cloud service. In other examples, the router may cause that an alert be generated and sent to an authorized user. An authorized user may be the user who gave the audible instructions to the voice assistant, to a different user, or combinations thereof. In some cases, the authorized user may have an option to permit the user command to go to the cloud service. The library of attributes associated with the user command may allow the system to learn the user commands over time based on the encrypted traffic without reliance on the speech recognition of the audio recordings.

In some situations, the router may not rely on an audible user command to determine whether a user policy is triggered. For example, the router may not hear an audible command. In some examples, the system may have a higher confidence in the associated attributes of the user command than in the interpretation of the audible message. In such examples, the system may use the attributes of the user commands contained in the library to determine when a user command triggers a security policy.

In some situations, certain user commands may trigger security policies under some predefined contexts, but not during other predefined contexts. For example, a user command instructing that a light be turned on in a child's room may trigger a security action during the hours of 9 pm and 7 am. However, user commands to turn on the light in the child's room during other hours of the day may not trigger the user command. A non-exhaustive list of predefined contexts that may selectively trigger a security action include a time context, a user location context, a device location context, a user identity context, a device type context, a device identification context, another type of context, or combinations thereof.

In some examples, a method may be used to correlate encrypted traffic patterns as observed in an internet router that routes communication between voice assistant client devices and a cloud voice service, with the raw audio captured by a microphone built into the router to identify user commands. After a user command is detected during a conversation with the assistant, the method may include applying security and policy controls defined or chosen previously by the user.

In some cases, a voice assistant client device interacts with a cloud voice service to recognize voice commands issued by a user. When a command is recognized, an appropriate action may be taken by the device based on recommendations of the cloud service, which may include speaking the results to the user, sending a request to (or interacting with) an IoT device in the network, sending a request to an external service in the cloud, and so on. Usually the types and numbers of voice commands supported today are up to a few hundred. In some case there may be full access to the user's network router. The method may include using a combination of statistical analysis of the encrypted traffic (between client and the cloud service) as seen by the router and the user's voice captured using one or more microphones built into (or external to) the router. Because the current voice assistant devices offload the voice recognition work to their cloud service counterparts, analyzing the encrypted traffic in conjunction with local analysis of the captured voice data provides useful features about the user's voice command. Such features include, but are not limited to at least one of a length of the voice recording based on the encoding used and number/length of packets; interaction pattern with the cloud service; how fast the user speaks, such as words per minute; silence thresholds and lengths from the captured voice; user's past command usage patterns; timing analysis, other features, and any combinations thereof.

In some cases, the known voice commands may be pre-processed to create a library of mapping for a few different speech patterns. With such features, a probable list of voice commands with their match scores may be computed. The best match—when it crosses a certain threshold—may be used as the final match and then subjected to policy enforcements.

When a user command is recognized, the method may include enforcing policy decisions that may be static/dynamic based at least in part on the context such as IoT/external device type that is being interacted with, device internet protocol (IP) address, media access control (MAC) address, time of day, user command type, location of the user, and so on. The enforcement action may range from logging the alert to completely dropping the command altogether in the router. For instance, a policy rule may suggest any command to open a Wi-Fi-enabled door lock be dropped if the time of day is between 10 PM and 5 AM in the night for a match with threshold of 0.6.

Actions that drop or change the behavior for the user command may be notified to the user through notifications such as voice playback (using a speaker in the router), alerts sent to the smartphone, email, etc. Besides, two-factor authentication mechanisms may be provided to users to confirm critical operations. The policy mechanism and enforcement may choose to use a combination of blacklist and whitelist for better efficacy too. In some cases, security actions may also include blocking asynchronous communication initiated by the server-side, surreptitious communication sent from the client device, e.g. voice traffic without any user being actively engaged, or such activities, to further improve security and privacy.

The method may include voice assistant client device that implements the client APIs exposed by cloud voice services to interact with the service and then implements and enforces policies. This approach may provide more control to limit interaction with IoT devices and their functions as per the policies defined. This allows the system to get direct feedback from the cloud service about the exact command issued by the user, add more sensors for better experience and to understand the environment better.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, database 120, and a network 115 that allows the device 105, the server 110, and database 120 to communicate with one another.

Examples of the device 105 may include any combination of mobile devices, smart phones, personal computing devices, computers, laptops, desktops, servers, media content set top boxes, routers, or any combination thereof. Examples of server 110 may include any combination of a data server, a cloud server, an automation server, proxy server, mail server, web server, application server, database server, communications server, file server, home server, mobile server, name server, or any combination thereof.

In some configurations, the device 105 may include a user interface 135, application 140, and user command module 145. Although the components of the device 105 are depicted as being internal to the device 105, it is understood that one or more of the components may be external to the device 105 and connect to device 105 through wired and/or wireless connections. In some embodiments, application 140 may be installed on a remote computing device in order to allow a remote user to interface with a function of device 105, user command module 145, and/or server 110.

In some examples, device 105 is a router that receives communications from a voice assistant 170. The voice assistant 170 may communicate with a cloud service 180 via the device 105. The voice assistant 170 may send and receive instructions based on user commands audibly spoken by a user. These user commands may be recorded with a microphone at the voice assistant 170 or at another location and interpreted at the cloud service 180. The cloud service 180 may send the user commands back to the voice assistant 170 to forward the interpreted commands to the appropriate home automation devices or other types of devices in communication with voice assistant 170. In some cases, the cloud service 180 may route the interpreted messages directly to the devices that are to carry out the user command. The devices to carry out the user command may be in communication with the voice assistant 170 and/or the device 105.

In some embodiments, device 105 may communicate with server 110 via network 115. The network 115 may also be in communication with the voice assistant 170, the cloud service 180, and other devices that are to carry out the user commands interpreted by the cloud service 180. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a user command module 145. For example, device 105 may include application 140 that allows device 105 to interface with a remote device via user command module 145 located on another device such as a remote computing device and/or server 110. In some embodiments, device 105 and server 110 may include a user command module 145 where at least a portion of the functions of user command module 145 are performed separately and/or concurrently on device 105 and/or server 110. Likewise, in some embodiments, a user may access the functions of device 105 (directly or through device 105 via user command module 145) from a remote computing device. For example, in some embodiments, a remote computing device includes a mobile application that interfaces with one or more functions of device 105 user command module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include a user command library 160. For example, device 105 may access the user command library 160 in database 120 over network 115 via server 110. The user command library 160 may contain attributes of user commands taken over time. These attributes may be derived from audible recordings taken with the user command module 145 of device 105. In some examples, the attributes are derived from encrypted traffic between the voice assistant 170 and the cloud service 180.

The user command module 145 may capture information about user commands given by a user. In some cases, the user command module 145 captures the audible instructions given by the user to the voice assistant 170. The user command module 145 may cause the audible message be interpreted, associated with a user command, and be stored in the user command library 160. The user command module 145 may also detect the traffic between the voice assistant 170 and the cloud service 180. The attributes of this traffic may be associated with the interpreted user command from the user's audible message. Comparing the attributes of the traffic to the interpreted user commands may allow the user command module to learn the user commands based on the attributes of the traffic. In some cases, the traffic is encrypted, but the attributes of the encrypted traffic, such as encrypted traffic length and interactive patterns between the voice assistant 170 and the cloud service 180, may be used to identify the user commands through the encryption. Some of the user commands trigger a security policy. In those situations where the security policy is triggered with a user command, the user command module 145 may perform the security action. In some cases, the security policy includes blocking the user action from reaching the cloud service 180 or sending an alert to an authorized user to determine whether the user command is to be blocked. User interface 135 may enable a user to interact with, control, and/or program one or more functions of user command module 145. Further details regarding the user command module 145 are discussed below.

Figure 2:
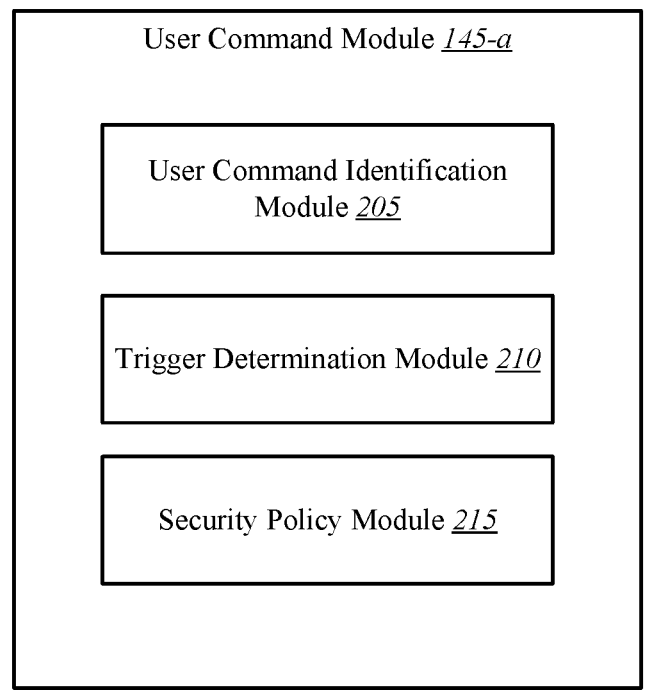
FIG. 2 is a block diagram illustrating one example of a user command module.

FIG. 2 is a block diagram illustrating one example of a user command module 145-*a*. The user command module 145-*a* may be one example of the user command module 145 depicted in FIG. 1. As depicted, the user command module 145-*a* may include a user command identification module 205, a trigger determination module 210, and a security policy module 215.

The user command identification module 205 may identify a user command issued by a user to a voice assistant. The user command identification module 205 may identify the user command based on attributes of an audio recording of the audible instructions given to the voice assistant by the user, attributes of the encrypted traffic through a router in communication with the voice assistant and the cloud service, through an interpretation of the audible recording, from another source, or combinations thereof. In some circumstances, a library of the recorded audible instructions from the user, the interpretation of the audible instructions, and attributes of encrypted traffic are associated with their respective user commands. In some circumstances, traffic is passed between the voice assistant and the cloud service, but due to the encryption, the user command module 145-*a* cannot read the traffic. However, by comparing the attributes of the encrypted traffic through the router with the attributes of the encrypted traffic stored in the library, the user commands associated with the attributes of the encrypted traffic stored in the library may be identified as the user commands passing through the router.

The trigger determination module 210 may determine when a user command triggers a security policy. In some cases, a predefined list of user commands are identified as triggers that trigger a security policy. In some cases, the same security policy is associated with each of the user commands on the list. However, in other examples, at least some of the user commands of the list are associated with at least one different security policy. In some cases, a user command may trigger a security policy only when certain circumstances apply. These user commands may be classified to trigger a security when the user command is used under a predefined context.

The security policy module 215 may be implemented in response to determining that a user command triggers a security policy. The security policies may include blocking the user command from reaching the cloud service, blocking the user command from the cloud service, sending an override command to undo the user command, generating an alert to an authorized user, sending an alert to an authorized user, another action, or combinations thereof.

Figure 3:
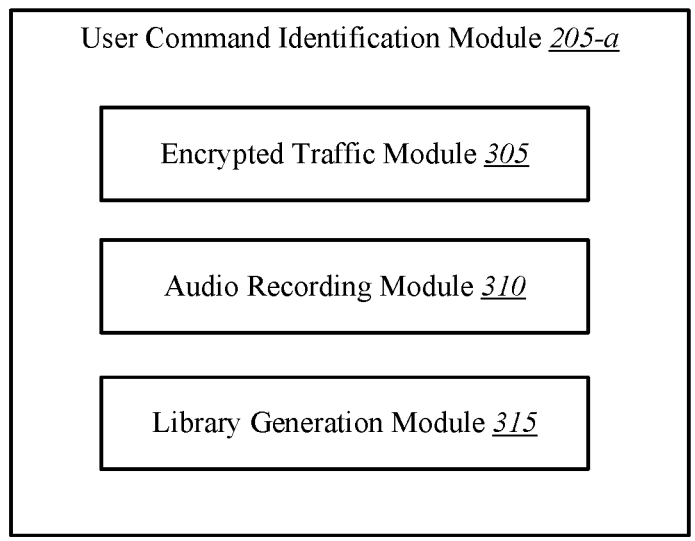
FIG. 3 is a block diagram illustrating one example of a user command identification module.

FIG. 3 is a block diagram illustrating one example of a user command identification module 205-*a*. The user command identification module 205-*a* may be one example of user command identification module 205 depicted in FIG. 2. As depicted, the user command identification module 205-*a* may include an encrypted traffic module 305, an audio recording module 310, and a library generation module 315.

The encrypted traffic module 305 may collect attributes about the traffic passing through a device that connects the voice assistant with the cloud service. In some examples, the device is a router the interfaces with a home network to the network external to the home network. In some cases, the encrypted traffic module 305 cannot read the encrypted traffic, but may collect attributes about the traffic. For example, the encrypted traffic module 305 may collect the length of a communication between the encrypted user command. In one such example, when a user speaks to the voice assistant a command to "turn on the light," the encrypted traffic module 305 may see the encrypted form of "turn on the light" pass through the router. This encrypted form may be consistent each time the user gives this user command. The encrypted traffic module 305 may record the length of the encrypted form of "turn on the light." The encrypted traffic module 305 may record the lengths of other encrypted forms of other user commands.

The encrypted traffic module 305 may also record other attributes of the encrypted traffic through the router or another type of device. For example, the interactive patterns between the voice assistant and the cloud service is another attribute that may be associated with the user command. As an exemplary embodiment, the user may ask the voice assistant to tell the user whether the outside lights of the house are off. This message may go through the router or another device to the cloud service where the cloud service sends back a response, such as "no." This response from the cloud service may also go through the router or other device to the voice assistant. The user may then request that the outside lights be turned on through the voice assistant. Accordingly, the voice assistant may send the request to the cloud service through the router or other device. The cloud service may then send instructions for the outside lights to be turned on through the router or other device. Each time a communication passes through the router, the router may record the attributes of these communications, such as the spacing between the different communications, the direction of the communications, the length of each of the communications, other attributes of each of these communications, or combinations thereof.

The audio recording module 310 may record the audible instructions or requests from the user. In some cases, the audio recording module 310 includes a microphone that is built into or in communication with the router. In some cases, the audio recording module 310 includes a microphone that is built directly into the voice assistant. The audio recording module 310 may cause the audio recordings to be interpreted and/or associated with a user command.

The library generation module 315 may generate a library that contains the attributes from the encrypted traffic, attributes from the audio recordings, other types of attributes, or combinations thereof. The audio recording may be interpreted and/or associated with a specific user command. For example, if the user requests that the outside lights be turned on through the voice assistant, a speech recognition program may identify that the user command is to turn on the outside lights. In response, the library generation module 315 may create a user command for turning on the outside lights. The library generation module 315 may also create a field to contain the audio recording with the instructions to turn off the outside lights. Additionally, the library generation module 315 may also generate library fields for the encrypted traffic attributes, such as length of the encrypted instructions, the direction of the traffic, the interactive pattern between the voice assistant, the identity of the user making the request, and the cloud service, and so forth. Each of these fields, the attributes, the audio recordings, and the user commands may be linked to each other in the library.

The library generation module 315 may create the associations between the attributes, the user commands, the audio recordings, and other data over time. A confidence level between the attributes of the encrypted data and specific user commands may be developed over time. For example, the phrase to "turn on the outside lights" may be similar to the phrase to "turn on the kitchen lights." In some cases, the encrypted form of the instructions to turn on the outside lights and to turn on the kitchen lights may have a similar length. Thus, in such an example, the length attribute of the encrypted message, by itself, may not be sufficient to be relied upon to determine the user command. However, the length attribute combined with a time of day attribute may render a higher confidence level. For example, the user may consistently request that the kitchen light be turned on at the same time each day. Thus, over time, the correlation with the length attribute and time of day attribute may render a higher degree of confidence when that specific user command is issued at that time of day.

Over time, the degree of confidence to one or more encrypted traffic attributes may be high enough that the encrypted traffic attributes may be sufficient for identifying the user command. For example, even without hearing an audible instruction from the user, the router may detect a length attribute of an encrypted message, a direction attribute of the encrypted message, and a time of day attribute of the encrypted message that are stored in the library and collectively have a high confidence associated with each other that the user command identification module 205-*a* may determine that the user command is an instruction to turn on the kitchen light. While this example has been described in particular to identifying a particular user command, any appropriate user command may be determined using these principles as outlined in this disclosure.

Figure 4:
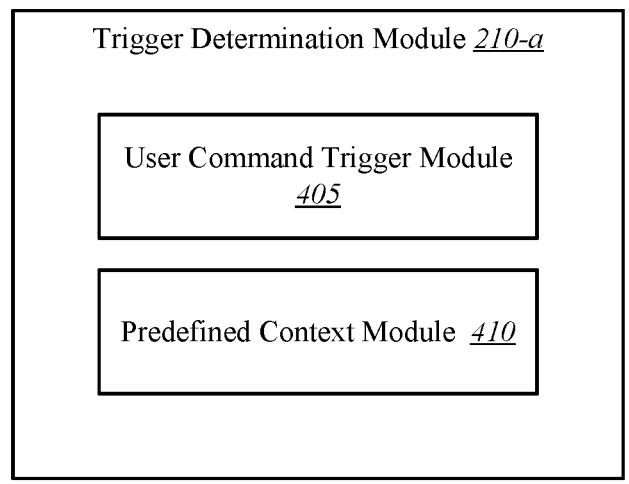
FIG. 4 is a block diagram illustrating one example of a trigger determination module.

FIG. 4 is a block diagram illustrating one example of a trigger determination module 210-*a*. The trigger determination module 210-*a* may be one example of the trigger determination module 210 depicted in FIG. 2. As depicted, the trigger determination module 210-*a* may include a user command trigger module 405, and a predefined context module 410.

The user command trigger module 405 may include a list of user commands that trigger a security policy. In some examples, each of the user commands on the list may be associated with a single security policy, such as blocking the user command. In other examples, the user commands of the list may be associated with at least two different security policies.

In this example, when the user command identification module 205-*a* determines that user command that is on the list has been issued by the user, the trigger determination module 210-*a* may send a message to the security policy module 215 to implement the associated security policy.

The predefined context module 410 may include a list of user commands that are only triggered under certain circumstances. In some cases, the predefined context module 410 may include a list of user commands that do not trigger a security policy in predefined contexts. The predefined context associated with each of the user commands on the list may determine whether or not the user command triggers a security policy.

Figure 5:
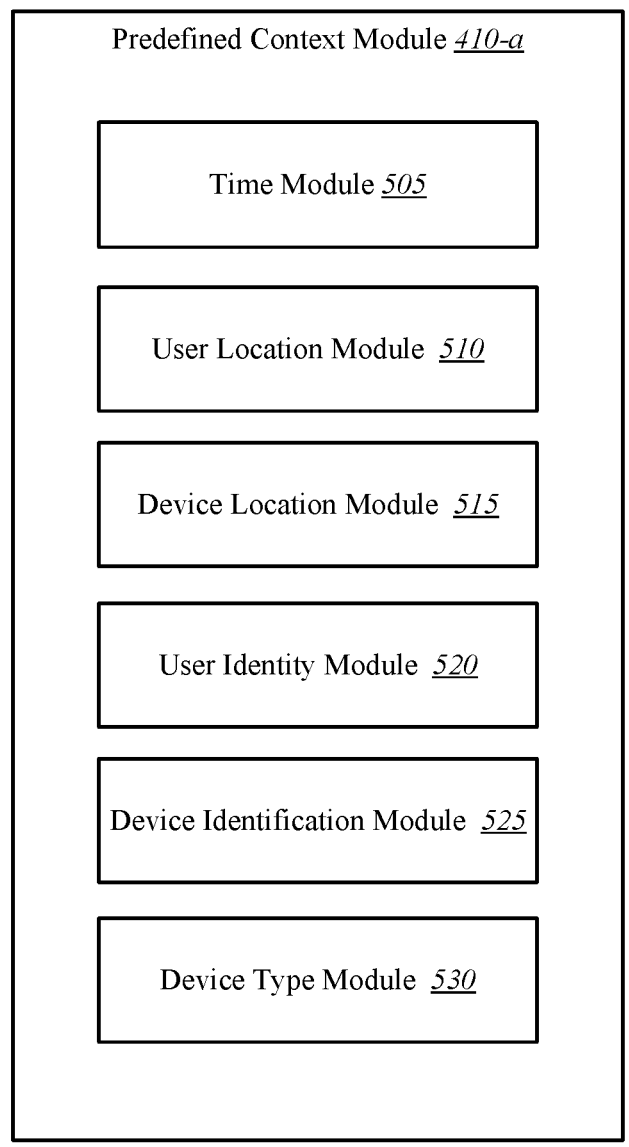
FIG. 5 is a block diagram illustrating one example of a predefined context module.

FIG. 5 is a block diagram illustrating one example of a predefined context module 410-a. The predefined context module 410-a may be one example of the predefined context module 410 depicted in FIG. 4. As depicted, the predefined context module 410-a may include a time module 505, a user location module 510, a device location module 515, a user identity module 520, a device identification module 525, and a device type module 530.

The time module 505 may define those user commands that are triggered only when the user command is given within a predetermined time context. For example, a user command to unlock a front door may trigger a security policy during 9:00 pm and 7:00 am, but not during other times of the day. The time module 505 may be associated with user commands that are based on a time of day context, a day of the week context, a month of the year context, another time period context, or combinations thereof.

The user location module 510 may define those user commands that are triggered when a user is at a predetermined location. For example, the user command to close a garage door may trigger a security action when the location of the user requesting that the garage door be closed is standing within an unsafe distance from the garage door. In some cases, the location of the user is determined based on the location of the user's mobile device. In another example, the location of the voice assistant may be used to determine the user's location. In this example, if the user is within speaking distance of the voice assistant, the user location module 510 may determine the general location of the user and whether the user command is triggered because of the user's location. In other examples, the user location module 510 may be in communication with cameras or other types of sensors to assist the user location module 510 in determining the user's location.

The device location module 515 may define those user commands that are triggered when a device to be activated by the user command is within a predetermined location. For example, a user command to start a lawn mower to mow the backyard may trigger a security policy if the lawn mower is not located in the backyard. As an example, if the lawn mower is located in a living room of the house, the device location module 515 may block the user command from reaching the cloud service and thereby prevent the lawn mower from being turned on in the living room.

The user identity module 520 may define those user commands that are triggered when the request is made by a specific person. For example, a user command to preheat the oven may trigger a security policy when the identity of the user making the user command is a child. The user identity module 520 may store personal information about the occupants of a residence such as age, height, weight, handicaps, and so forth. Certain user commands may be unsafe for certain occupants to make. In these cases, the user identity module 520 may associate users with specific user commands that trigger the security policy. In another example, the user identity module 520 may associate specific users with certain user commands at an authorized user's request. For example, an occupant may be determined to be untrustworthy to operate certain types of devices. Thus, when the user makes the user command request to perform an action dealing with those specific devices, the user identity module 520 may cause the security policy to be triggered.

The device identification module 525 may define those user commands that are triggered when the request is made to operate a specific device. For example, a specific device may be determined to be broken or otherwise unsafe to operate. The device identification module 525 may cause a security policy to be implemented when the user command is for an operation of that type of device.

The device type module 530 may define those user commands that are triggered when a request is made to operate a specific type of device. For example, a device that includes electric heating elements may be associated with the device type module 530 to cause a security policy to be implemented when a request to operate an oven or another type of device with a heating element is made. The security policy may trigger an alert to be generated and sent to an authorized user. The authorized user may be given an option to permit the user command to be carried out or to cause the user command to be blocked.

Figure 6:
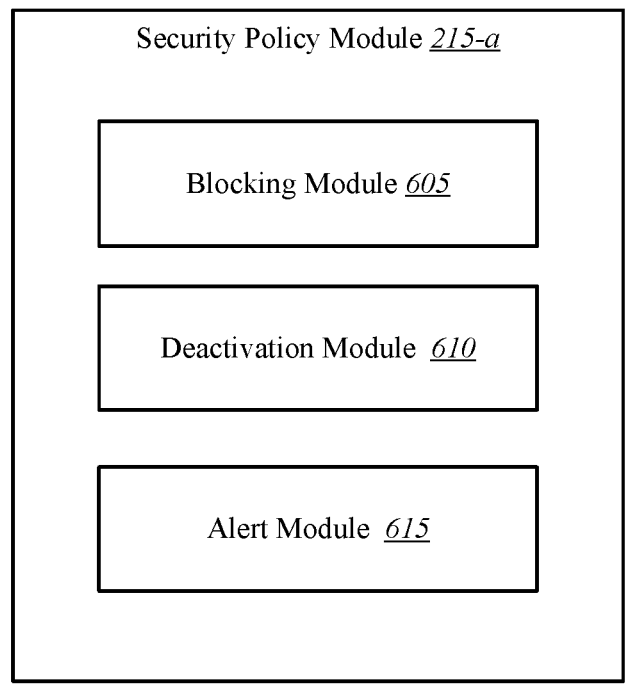
FIG. 6 is a block diagram illustrating an example of a security policy module.

FIG. 6 is a block diagram illustrating one example of a security policy module 215-a. The security policy module 215-a may be one example of the security policy module 215 depicted in FIG. 2. As depicted, the security policy module 215-a may include a blocking module 605, a deactivation module 610, and an alert module 615.

The blocking module 605 may cause the user command to be dropped if the type of user command triggers the security policy. For example, the router may recognize a user command that triggers the blocking module 605. In this example, the blocking module 605 may cause the router to drop the message that contains the user command. In some cases, the blocking module 605 may just cause the portion of the message containing the triggering user command to be dropped from the message. In such an example, the message may include multiple user commands to operate a device in the home, and the blocking module 605 may cause just the user command that triggers the security action to be dropped.

The deactivation module 610 may cause the user command to be undone if the user command was initially implemented before the user command was determined to trigger the security action. For example, if the user command is to preheat the oven and the user command is not initially recognized to trigger a security policy, the deactivation module 610 may send instructions to the voice assistant to turn the oven off. In some cases, an alert may be sent after the oven or other device is deactivated.

The alert module 615 may cause an alert to be sent when a security action is triggered. The alert may notify the user that the user command was issued. In some cases, the alert may also give the user an option to permit the user command to be carried out. In other examples, the alert merely notifies the user. The alert may also send a reason why the user command triggers a security action, such as the device to be operated is broken, the device has a recall, a government regulation would be broken if the user command was carried out, another type of reason, or combinations thereof. The alert may also provide instructions to the user for how to remove the restriction on the device for future user commands.

Figure 7:
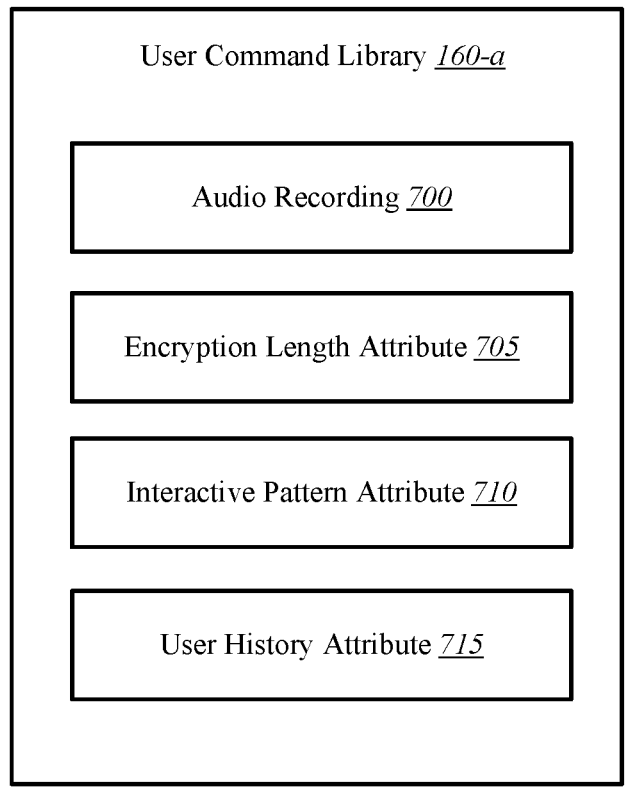
FIG. 7 is a block diagram illustrating an example of a user command library.

FIG. 7 is a block diagram illustrating one example of a user command library 160-a. The user command library 160-a may be one example of the user command library 160 depicted in FIG. 1. As depicted, the user command library 160-a may include an audio recording 700, an encryption length attribute 705, an interactive pattern attribute 710, and a user history attribute 715.

The audio recording 700 may be obtained with a microphone or another type of device that captures the audible instructions of the user to the voice assistant. In some cases, the audio recording 700 is interpreted with a speech recognition program that determines the user command out of the audio recording 700. The audio recording 700 may be stored in the user command library 160-a and be associated with the user command.

In some cases, the traffic between the voice assistant and the cloud service is encrypted. In those examples where the router or other device that sees the traffic between the voice assistant and the cloud service is an independent device, the router may not have access to an encryption key to interpret the communications between the voice assistant and the cloud service. But, in some cases, the user command module may record the attributes of the encrypted traffic and associate those attributes with the user command.

The audio recordings 700 may be time stamped at the same time that the encrypted traffic is recorded. By using these time stamps, the audio recordings 700 may be matched to the encrypted traffic and also to the user command associated with the audio recordings 700. Over time, a strong correlation between the attributes of the encrypted traffic and the user command may be determined. With a strong correlation between certain attributes of the encrypted traffic and the user command, the user command library 160-a may be used to look up the attributes of the encrypted traffic and the associated user command to determine the user command issued by the user in real time. Thus, over time, the user command module may determine the user command quicker with a high degree of accuracy.

The encryption length attribute 705 may be the length of the message containing the encrypted user command. Requests from the user that involve a minimal amount of explanation may include shorter messages to the cloud service from the voice assistant. Those user commands that involve multiple steps may include longer messages from the cloud service back to the voice assistant. The lengths of these encrypted messages may vary based on the user command. The encryption lengths may be recorded and stored in the user command library 160-a and be associated with the appropriate user command.

The interactive pattern attribute 710 may include the sequence of communication between the voice assistant and the cloud service. In some cases, a request from the user to execute a certain user command may involve the voice assistant sending a first communication to the cloud service, and the cloud service sending a second message back to the voice assistant. This pattern may be consistent for that user command. Thus, in this scenario, the pattern of a single message from the voice assistant to the cloud service with a single message from the cloud service to the voice assistant is an attribute that may be associated with the user command in the user command library 160-a.

In another example, the pattern between the voice assistant and the cloud service may involve sending a first message from the voice assistant to the cloud service over the router, and the cloud service sending a second message to a different device other than the voice assistant. One such example may include sending a message to the device that is intended to carry out the user command. Even though the second message does not retrace its communication path all the way back to the voice assistant, the second message may still go through the router which services as the interface between the home network and the network external to the home. Thus, the router sees both the first message and the second message. This pattern of communication may also be an attribute that may be stored in the user command library 160-a and be associated with the respective user command.

In yet another example, the voice assistant may send a first message to the cloud service through the router or other device that sees the encrypted traffic, and the cloud service may send multiple return messages through the router to either the voice assistant or to another device. The pattern of the voice assistant sending a single message to the cloud service and the cloud service sending multiple messages may also be an attribute that may be stored in the user command library 160-a and be associated with the respective user command. In other types of patterns, the length of the different messages from the cloud service may vary, which is another attribute of the pattern that may be associated with the appropriate user command. Additionally, the interactive pattern attribute may include the lengths of the different messages, the direction of the different messages, the destination of the different messages, other attributes of the pattern of communication between the voice assistant and the cloud service, or combinations thereof.

The user history attribute 715 may include a record of the user commands requested by the user. A log may be kept in the user command library 160-a that time stamps the requested user commands. The frequency that certain user commands are requested, the time of day that certain user commands are requested, and other attributes in the user history may be associated with the appropriate user command. Over time, a correlation between the types of user commands most likely to be requested by the user may be factored into determining what user commands are issued by the user. For example, if the user frequently requests for the kitchen light to be turned on at the same time each day, the user command library may have a high confidence that a request by the user made at that time of day is a user command to turn on the kitchen light.

Figure 8:
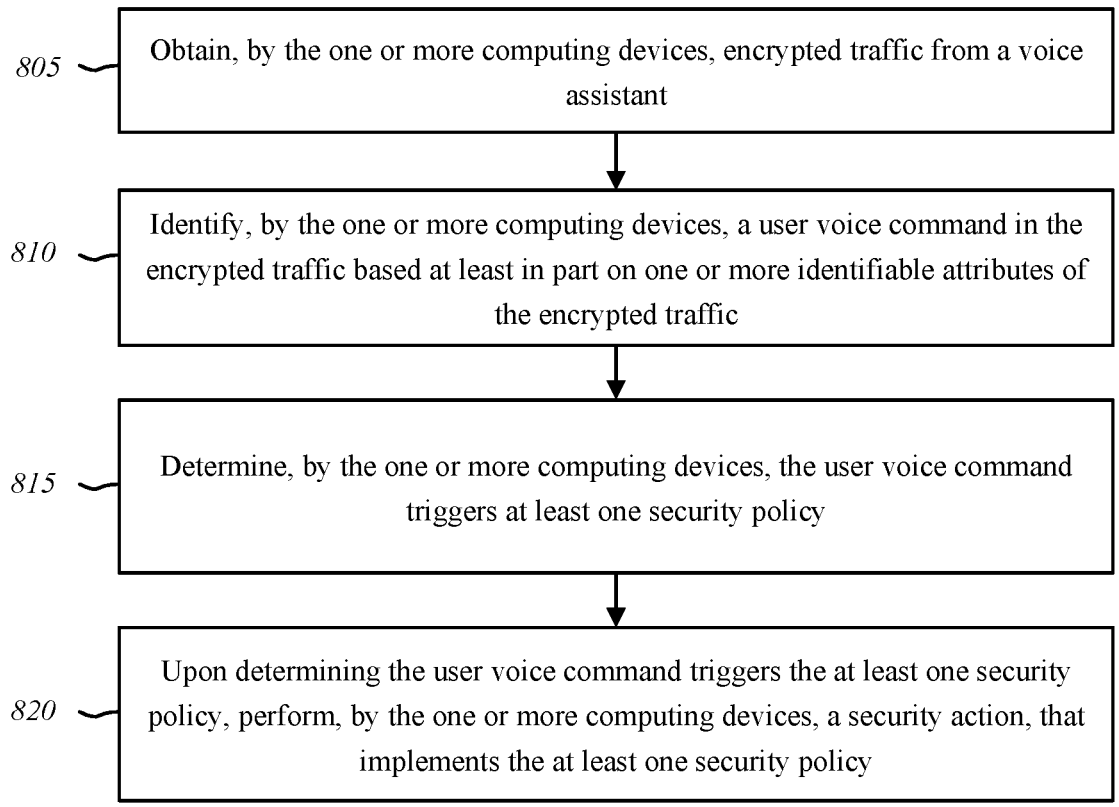
FIG. 8 is a flow diagram illustrating one embodiment of a method for implementing a security policy with a voice assistant.

FIG. 8 is a flow diagram illustrating one embodiment of a method 800 for implementing a security policy with a voice assistant. In some configurations, the method 800 may be implemented by the user command module 145 illustrated in FIGS. 1 or 2. In some configurations, the method 800 may be implemented in conjunction with the application 140 and/or the user interface 135 illustrated in FIG. 1.

At block 805, the method 800 may include obtaining, by one or more computing devices, encrypted traffic from a voice assistant. The one or more computing devices may include a router, the voice assistant, a microphone, a mobile device, other types of devices, or combinations thereof. At least one of the devices may see the communications from the voice assistant. In some cases, the one or more devices may also see the communications from the cloud service in response to receiving the communications from the voice assistant.

At block 810, the method 800 may include, identifying, by the one or more computing devices, a user voice command in the encrypted traffic based at least in part on the one or more identifiable attributes of the encrypted traffic. The user command may be identified by using a microphone associated with at least one of the devices. In some cases, the microphone is associated with the voice assistant. In other examples, the microphone is associated with a router in communication with the voice assistant. In yet another example, the microphone is associated with another type of device that may listen to the user commands given by the user. The audio recordings of these voice commands may be used to initially determine the user commands. The attributes of the encrypted traffic and the user commands may be stored in a user command library. In some cases, the user command may be identified by the encrypted traffic attributes associated with the user commands in the library. Over time, the correlation between the encrypted traffic attributes and the user commands may become stronger as more attributes are consistently present when the user issues a user command through the voice assistant.

At block 815, the method 800 may include determining, by the one or more computing devices, the user voice command triggers at least one security policy. A table may associate the user commands with the trigger security policy, and when a user command is issued, the method may include consulting the table to determining whether the user command is associated with a security policy. In some cases, the user command may trigger the security policy depending on the context. For example, the context of when the user command is issued, who issued the user command, on which device is the user command to be executed, and so forth may determine whether the user command triggers a security policy or not.

At block 820, the method 800 may include performing, by the one or more computing devices, a security action that implements the at least one security policy upon determining that the user command triggers a security policy. In some cases, there is a single security policy for each of the triggered user commands. In other cases, different security policies may apply to different user commands. In one example, the security policy includes blocking the user command at the router from reaching the cloud service. In another example, the security policy may include generating an alert and sending the alert to an authorized user. The alert may indicate that the user command has been requested. In some cases, the user may be given the option to permit the user command from occurring or to block the user action from occurring.

Figure 9:
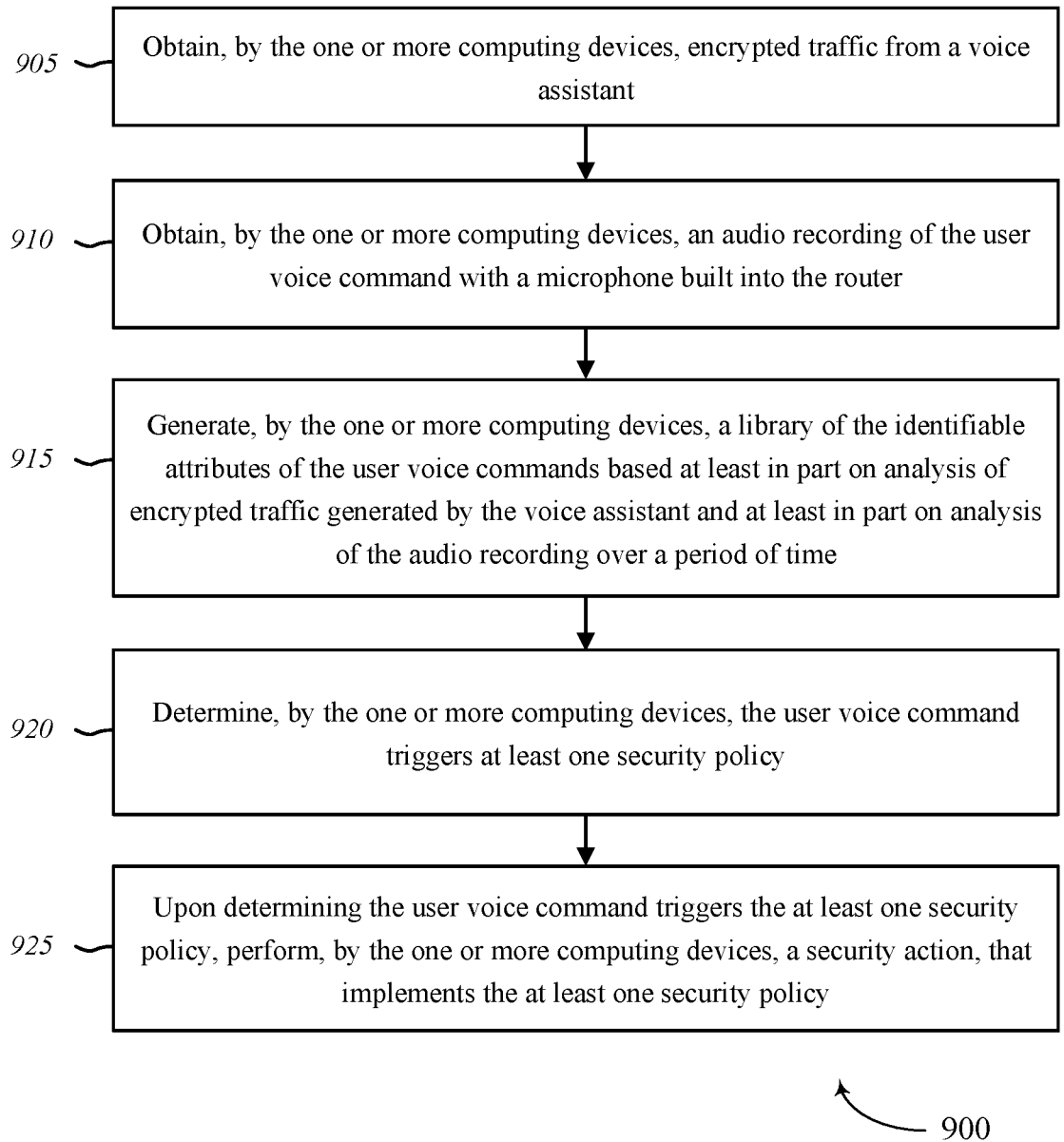
FIG. 9 is a flow diagram illustrating one embodiment of a method for implementing a security policy with a voice assistant.

FIG. 9 is a flow diagram illustrating one embodiment of a method 900 for implementing a security policy with a voice assistant. In some configurations, the method 900 may be implemented by the user command module 145 illustrated in FIG. 1 or 2. In some configurations, the method 900 may be implemented in conjunction with the application 140 and/or the user interface 135 illustrated in FIG. 1.

At block 905, the method 900 may include obtaining, by one or more computing devices, encrypted traffic from a voice assistant. The one or more computing devices may include a router, the voice assistant, a microphone, a mobile device, other types of devices, or combinations thereof. At least one of the devices may see the communications from the voice assistant. In some cases, the one or more devices may also see the communications from the cloud service in response to receiving the communications from the voice assistant.

At block 910, the method 900 includes obtaining, by the one or more computing devices, an audio recording of the user voice command with a microphone built into the router. In some examples, the audio recording may be analyzed with a speech recognition program that determines the user command in the audio recording.

At block 915, the method 900 includes generating, by the one or more computing devices, a library of the identifiable attributes of the user voice commands based at least in part on the analysis of the encrypted traffic generated by the voice assistant and at least in part on analysis of the audio recording over a period of time. In some examples, the user command is identified through the analysis and stored in the library. The encrypted traffic with the same time stamp as user command may be associated with each other in the library. Over time, the attributes of the encrypted traffic may be used alone to determine the user command.

At block 920, the method 800 may include determining, by the one or more computing devices, the user voice command triggers at least one security policy. A table may associate the user commands with the trigger security policy, and when a user command is issued, the method may include consulting the table to determining whether the user command is associated with a security policy. In some cases, the user command may trigger the security policy depending on the context. For example, the context of when the user command is issued, who issued the user command, on which device is the user command to be executed, and so forth may determine whether the user command triggers a security policy or not.

At block 925, the method 800 may include performing, by the one or more computing devices, a security action that implements the at least one security policy upon determining that the user command triggers a security policy. In some cases, there is a single security policy for each of the triggered user commands. In other cases, different security policies may apply to different user commands. In one example, the security policy includes blocking the user command at the router from reaching the cloud service. In another example, the security policy may include generating an alert and sending the alert to an authorized user. The alert may indicate that the user command has been requested. In some cases, the user may be given the option to permit the user command from occurring or to block the user action from occurring.

Figure 10:
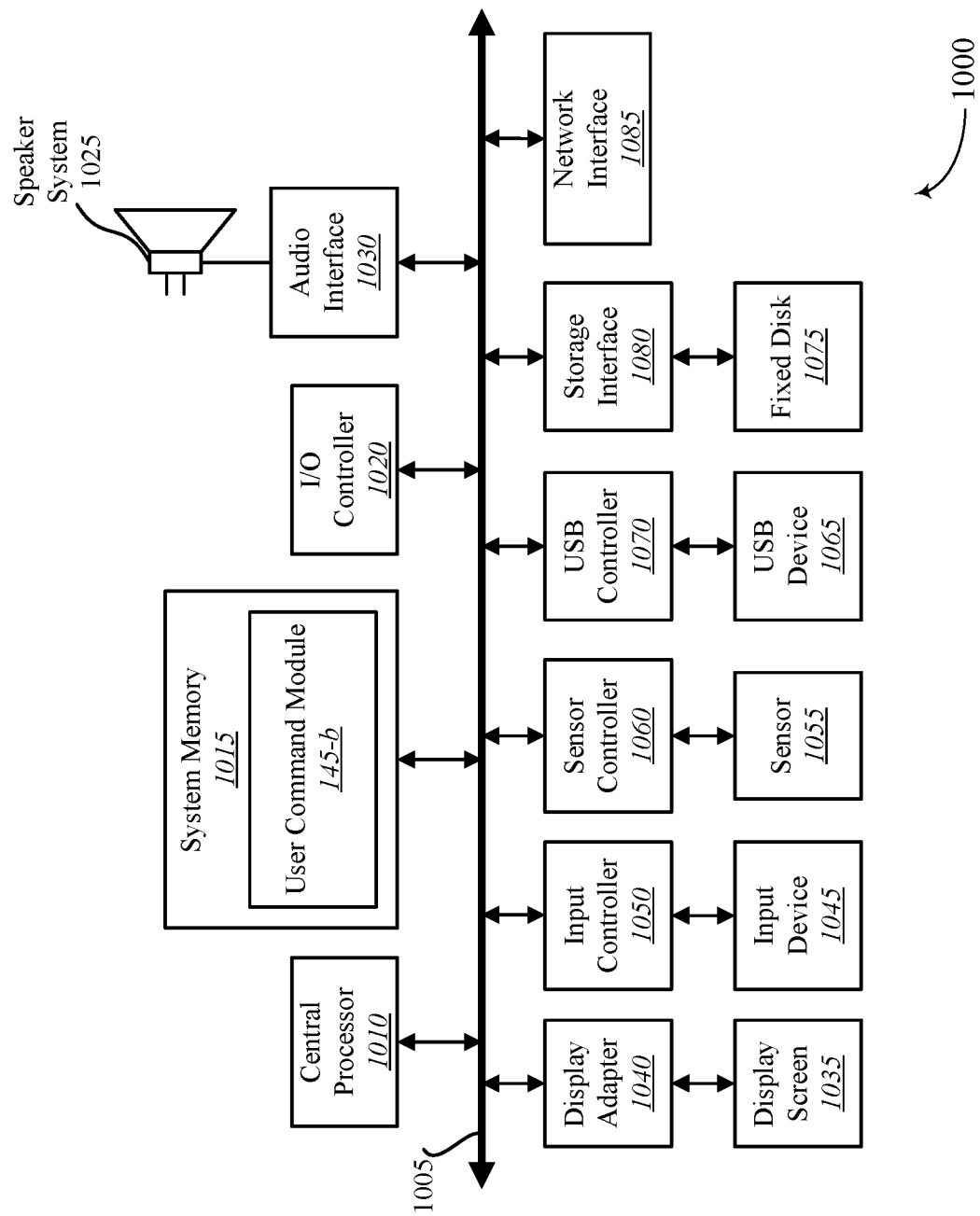
FIG. 10 depicts a block diagram of an example of a computer system suitable for implementing the present systems and methods.

FIG. 10 depicts a block diagram of a computing device 1000 suitable for implementing the present systems and methods. The device 1000 may be an example of device 105, and/or server 110 illustrated in FIG. 1. In one configuration, device 1000 includes a bus 1005 which interconnects major subsystems of device 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. For example, the user command module 145-*b* to implement the present systems and methods may be stored within the system memory 1015. Applications (e.g., application 140) resident with device 1000 are generally stored on and accessed via a non-transitory computer readable medium, such as a hard disk drive (e.g., fixed disk 1075) or other storage medium. Additionally, applications may be in the form of electronic signals modulated in accordance with the application and data communication technology when accessed via interface 1085.

Storage interface 1080, as with the other storage interfaces of device 1000, may connect to a standard computer readable medium for storage and/or retrieval of information, such as a fixed disk drive 1075. Fixed disk drive 1075 may be a part of device 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 1000 wirelessly via network interface 1085.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems may be interconnected in different ways from that shown in FIG. 10. The aspect of some operations of a system such as that shown in FIG. 10 are readily known in the art and are not discussed in detail in this application. Code to implement the present disclosure may be stored in a non-transitory computer-readable medium such as one or more of system memory 1015 or fixed disk 1075. The operating system provided on device 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 1000 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 1085 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 1020 may operate in conjunction with network interface 1085 and/or storage interface 1080. The network interface 1085 may enable system 1000 with the ability to communicate with client devices (e.g., device 105 of FIG. 1), and/or other devices over the network 115 of FIG. 1. Network interface 1085 may provide wired and/or wireless network connections. In some cases, network interface 1085 may include an Ethernet adapter or Fibre Channel adapter. Storage interface 1080 may enable system 1000 to access one or more data storage devices. The one or more data storage devices may include two or more data tiers each. The storage interface 1080 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for implementing a security policy with a voice assistant, the method being performed by one or more computing devices, each comprising one or more processors, the method comprising:
    obtaining, by the one or more computing devices, encrypted traffic from the voice assistant;
    obtaining, by the one or more computing devices, an audio recording of the user voice command with a microphone built into the one or more computing devices;
    generating, by the one or more computing devices, a library of one or more identifiable attributes of the user voice command based at least in part on analysis of the encrypted traffic generated by the voice assistant and at least in part on analysis of the audio recording over a period of time;
    identifying, by the one or more computing devices, the user voice command in the encrypted traffic obtained by the one or more computing devices based at least in part on the one or more identifiable attributes of the encrypted traffic;
    determining, by the one or more computing devices, the user voice command triggers at least one security policy; and
    upon determining the user voice command triggers the at least one security policy, performing, by the one or more computing devices, a security action that implements the at least one security policy.

2. The method of claim 1, wherein a router in communication with a cloud service obtains the encrypted traffic, the router being connected by wire or wirelessly to the voice assistant and being placed between the voice assistant and the cloud service.

3. The method of claim 2, wherein performing the security action comprises:
    blocking, at the router, the user voice command received by the voice assistant from reaching the cloud service.

4. The method of claim 2, wherein the router comprises a microphone built into the router.

5. The method of claim 1, wherein identifying the user voice command includes matching at least one of the one or more identifiable attributes of the encrypted traffic with one or more attributes of an analyzed user voice command stored in the library.

6. The method of claim 5, wherein the one or more identifiable attributes of the encrypted traffic comprises at least an interactive data communication pattern between the voice assistant and the cloud service in communication with the voice assistant.

7. The method of claim 5, wherein the one or more identifiable attributes of the encrypted traffic comprises at least a user voice command history.

8. The method of claim 5, wherein the one or more identifiable attributes of the encrypted traffic comprises at least a length of the audio recording associated with the encrypted traffic.

9. The method of claim 1, wherein the security policy comprises:
    generating an alert based at least in part on the user voice command;
    and sending the alert to a user.

10. The method of claim 9, wherein the security policy comprises: blocking the user voice command based on a response from the user receiving the alert.

11. The method of claim 1, wherein implementing the policy comprises:
    blocking the user voice command when the user voice command is given under a predefined context.

12. The method of claim 11, wherein the predefined context is a time context, a user location context, a device location context, a user identity context, a device type context, a device identification context, or combinations thereof.

13. A computing device configured for implementing a security policy with a voice assistant, comprising:
    a processor;
    memory in electronic communication with the processor, wherein the memory stores computer executable instructions that when executed by the processor cause the processor to perform the steps of:
    obtaining encrypted traffic from a voice assistant;
    obtaining an audio recording of the user voice command with a microphone built into the computing device;
    generating a library of one or more identifiable attributes of the user voice command based at least in part on analysis of the encrypted traffic generated by the voice assistant and at least in part on analysis of the audio recording over a period of time;
    identifying the user voice command in the encrypted traffic obtained by the computing device based at least in part on the one or more identifiable attributes of the encrypted traffic;
    determining the user voice command triggers at least one security policy; and
    upon determining the user voice command triggers the at least one security policy, performing a security action that implements the at least one security policy.

14. The computing device of claim 13, wherein the computing device is a router in communication with a cloud service.

15. The computing device of claim 14, wherein the instructions executed by the processor cause the processor to perform the steps of:
    comparing the audio recording to the encrypted traffic.

16. The computing device of claim 13, wherein the instructions executed by the processor cause the processor to perform the steps of:
    determining a subsequent user voice command by comparing at least one attribute stored in the library.

17. The computing device of claim 13, wherein the at least one security policy comprises blocking the user voice command.

18. A non-transitory computer-readable storage medium storing computer executable instructions that when executed by a processor cause the processor to perform the steps of:
- obtaining encrypted traffic from a voice assistant;
- obtain an audio recording of the user voice command with a microphone built into one or more computing devices associated with the processor;
- generating a library of one or more identifiable attributes of the user voice command based at least in part on analysis of the encrypted traffic generated by the voice assistant and at least in part on analysis of the audio recording over a period of time;
- identifying a user voice command in the encrypted traffic obtained by the one or more computing devices based at least in part on one or more identifiable attributes of the encrypted traffic;
- determining the user voice command triggers at least one security policy; and
- upon determining the user voice command triggers the at least one security policy, performing a security action that implements the at least one security policy.

* * * * *